(12) United States Patent
Riggins

(10) Patent No.: US 8,695,944 B2
(45) Date of Patent: Apr. 15, 2014

(54) POWERED FISH TAPE

(76) Inventor: John R. Riggins, Edwardsville, IL (US)

( * ) Notice: Subject to any disclaimer, the term of this patent is extended or adjusted under 35 U.S.C. 154(b) by 226 days.

(21) Appl. No.: 13/407,880

(22) Filed: Feb. 29, 2012

(65) Prior Publication Data

US 2013/0221297 A1    Aug. 29, 2013

(51) Int. Cl.
*H02G 1/08*    (2006.01)

(52) U.S. Cl.
USPC .. 254/134.3 FT; 254/134.3 R; 254/134.3 CL; 254/342

(58) Field of Classification Search
CPC ......... H02G 1/08; H02G 1/085; H02G 1/086; B66D 1/14; B65H 75/38
USPC ........... 254/134.3 T, 134.3 R, 134.3 CL, 342; 242/243, 405.3, 225
See application file for complete search history.

(56) References Cited

U.S. PATENT DOCUMENTS

| | | | | |
|---|---|---|---|---|
| 1,956,806 A | * | 5/1934 | Mitzen et al. ................. | 254/342 |
| 3,232,555 A | * | 2/1966 | Gorrell et al. ............. | 242/390.8 |
| 5,110,092 A | * | 5/1992 | Blaha et al. .......... | 254/134.3 FT |
| 5,149,056 A | * | 9/1992 | Jones .................... | 254/134.3 FT |
| 5,423,516 A | * | 6/1995 | Blaha .................... | 254/134.3 FT |
| 6,170,775 B1 | * | 1/2001 | Kovacik et al. ................ | 242/404 |
| 6,361,021 B1 | * | 3/2002 | Brennan ............... | 254/134.3 FT |
| 6,513,791 B1 | * | 2/2003 | Yates .................... | 254/134.3 FT |
| 6,722,603 B1 | * | 4/2004 | Atencio ..................... | 242/390.8 |
| 6,896,242 B1 | * | 5/2005 | Konen .................... | 254/134.3 FT |
| 7,150,448 B1 | * | 12/2006 | Swift .................... | 254/134.3 FT |
| 8,496,229 B1 | * | 7/2013 | Mayhall ............... | 254/134.3 FT |
| 2007/0187659 A1 | * | 8/2007 | Wiesemann et al. . | 254/134.3 FT |
| 2007/0272905 A1 | * | 11/2007 | Ziebart et al. ........ | 254/134.3 FT |
| 2011/0133142 A1 | * | 6/2011 | Axon et al. ............ | 254/134.3 R |

* cited by examiner

*Primary Examiner* — George Nguyen
(74) *Attorney, Agent, or Firm* — Don W. Weber

(57) ABSTRACT

A metal fish tape for placing electrical wires in long conduit is coiled inside a cylindrical hollow case. The case has a slot all the way around it in the center of the edge of the cylindrical case. A handle is located in the slot. The case can rotate around its circumference when the handle is held stationary. Two sprocket gears connected to a hexagonal hub are attached to the handle. The gear teeth of the sprocket gears fit into a series of corresponding grooves that are located around the circumference of the case on each side of the case slot. The fish tape can still be used manually or the hub can be powered by a drill. When the handle (and sprocket gears) are held stationary, rotating the sprocket gears rotates the case and retracts the fish tape.

1 Claim, 2 Drawing Sheets

POWERED FISH TAPE

BACKGROUND OF THE INVENTION

This invention relates to the field of electrician's work. More particularly, a powered fish tape is presented that allows a workman to retract a fish tape using a power drill or the like.

In the electrician's industry it is quite often necessary to place or "fish" electrical line through long lengths of conduit. In order to do this, one first pushes a narrow metal strip, or tape, through the conduit. The electric wire is then attached to the extended end of the metal tape and the metal tape is then retracted through the conduit, pulling the wire through the conduit as well.

The common method of accomplishing this placement of the wire in the conduit is to use what is known in the industry as a fish tape. A good example of this type of device is found in the 2003 patent issued to Yates, U.S. Pat. No. 6,513,791. Yates describes the art and the well known reeling device. The Yates device utilizes a central hub to rotate the case while the handle is held stationary to either extend or retract the fish tape. However, it has been shown that a central drive for such a reeling device is prone to breaking due to the large stresses that may come to bear when reeling in a long length of metal tape. This feature also completely negates the normal operation of the hand-held tool.

It is an object of this invention to provide a powered drive for a fish tape that is durable and easy to use without interfering with the standard normal operation.

It is another object of this device to provide a power drive for a fish tape case that drives the case at its outer circumference, making the movement of long lengths of the metal tape easier and more efficient.

Other and further objects of this invention will become apparent upon reading the below described Specification.

BRIEF DESCRIPTION OF THE INVENTION

A powered fish tape device is presented that enables a worker to retract a fish tape using a power drill or similar device. The invention comprises the standard outer essentially cylindrical casing having a circumferential slot around the center of its outer edge with a coiled fish tape inside. The handle of the device is slidably attached to the case at the slot. Attached to the handle is a pair of sprocket gears with outer teeth rotatably attached to an axis hub. The axis hub is attached to the handle such that the hub and gears may rotate freely but are stationary with respect to the handle. The outer circumference of each half of the outer case has a plurality of grooves corresponding to the gear teeth. When a drill is attached to the hub and turned, the gears rotate the case which retracts the fish tape.

BRIEF DESCRIPTION OF THE DRAWING FIGURES

DETAILED DESCRIPTION OF THE PREFERRED EMBODIMENT

This invention is similar to other standard fish tape devices in general but has significant structural differences that enable a workman to use the device in conjunction with a drill or other powered device.

Figure 3:
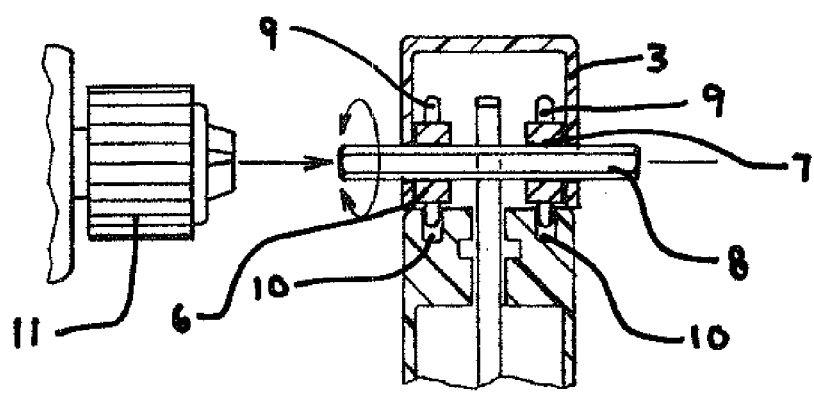
FIG. 3 is a side partial view of the device showing the inner parts of the device and a drill, taken along lines 3-3 of FIG. 2.

The device has an essentially cylindrical outer case, usually fabricated in front 1 and rear 2 sections. Each identical section is essentially cylindrical and hollow and adapted to receive a coiled metal fish tape as described below. These two sections are joined together in any convenient and workmanlike manner such as gluing or with screws attaching the two sections. The outer case has a central circumferential slot 5 along its edge as best shown in FIGS. 1 and 3.

The outer case has a handle 3 slidably engaged to the outer case such that the outer case rotates while the handle remains stationary and vice-versa. Normally, the lower part of the handle will have an outer flange which engages the inner sides of the outer case at the outer case circumferential slot 5. This central circumferential slot 5 runs around the circumference of the generally cylindrical case on its edge, as best shown in FIG. 1.

Figure 1:
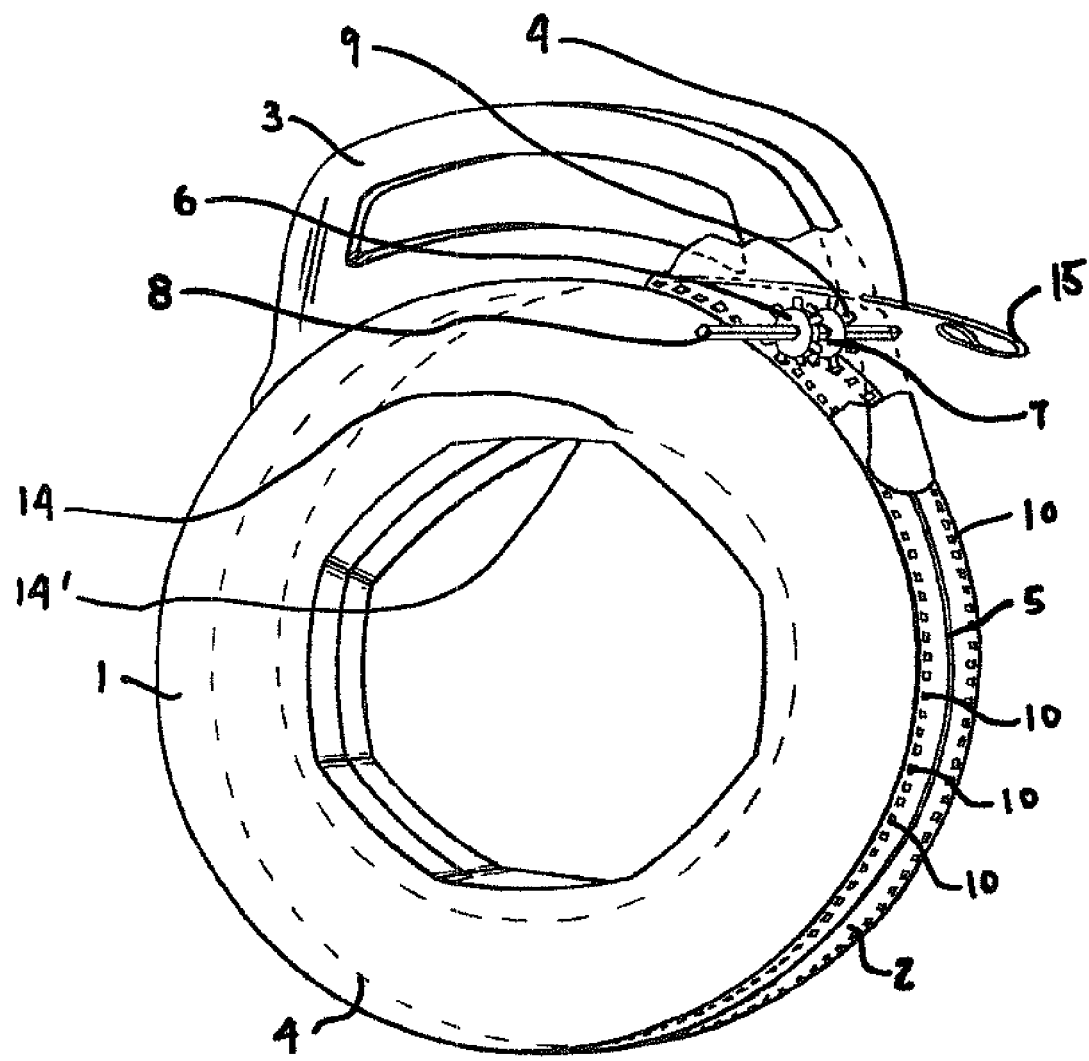
FIG. 1 is a front perspective view of the device.
Figure 2:
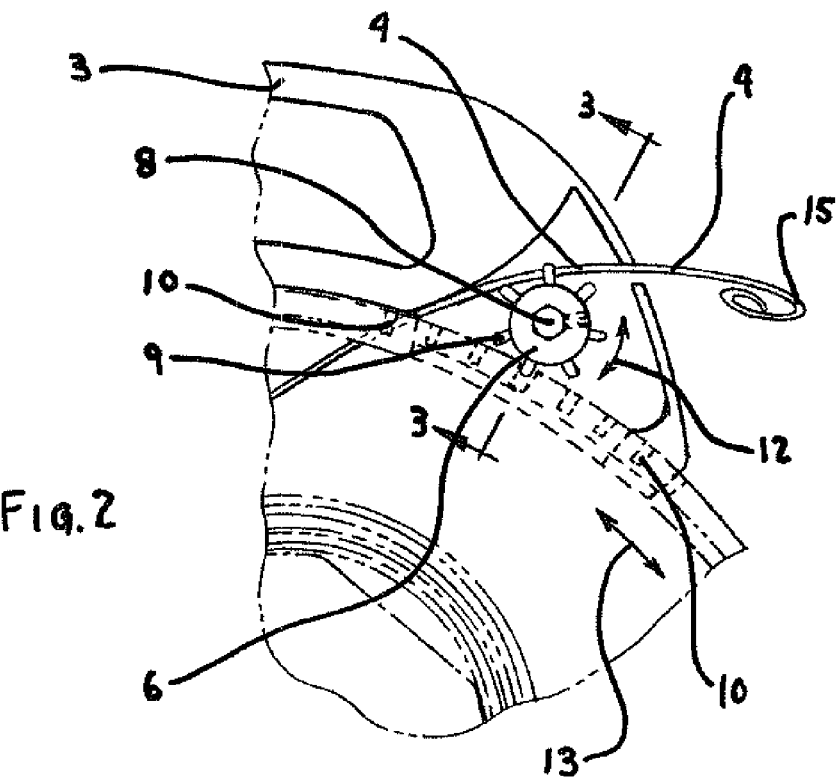
FIG. 2 is a front partial cutaway view of the device.

The fish tape 4 is coiled around on the inside of the case as shown in FIG. 1. In FIG. 1, the coiling of the fish tape 4 is shown in phantom lines. The inner end 14 of the fish tape is secured to the inner part 14' of the outer case as best shown in FIGS. 1 and 2. The outer end 15 of the fish tape extends out the circumferential slot 5. As the outer case rotates with respect to the slidable handle 3, the outer end 15 of the tape extends outwardly. This general apparatus is well known in the art.

The unique aspect of this invention is the double sprocket gears 6 and 7. These front 6 and rear 7 sprocket gears enable the device to retract the fish tape. The sprocket gears 6 and 7 are fixedly connected to the hexagonal hub axis 8. The sprocket gears have teeth 9 located about the outer circumference of each gear as best shown in FIGS. 2 and 3.

Located about the outer circumferential edge of each half of the outer case are a series of grooves 10 corresponding to the gear teeth 9. These grooves 10 are located on the outer edge of each half of the outer case as best shown in FIG. 1.

The hub axis 8 is attached to the handle 3 as best shown in FIGS. 2 and 3. The front 6 and rear 7 gears engage the front 1 and rear 2 outer case grooves 10 to rotate the outer case when the handle is held stationary. To retract the fish tape 4, the gears 6 and 7 are rotated in the direction of arrow 12. This action, in turn, rotates the outer case in the direction of arrow 13, thus retracting the end of fish tape 15.

Many known fish tape devices include some sort of manual turning device. However, this particular invention allows a powering device, such as an electric drill 11 to be attached to the hub axis 8. The drill can then be used to rotate the hub axis 8, which in turn retracts the outer end 15 of the fish tape 4.

The device incorporates much of the structure of the common fish tapes currently in the art. However, it adds the structure of the gears, hub and circumferential grooves to allow for an efficiently powered fish tape apparatus that does not interfere with, but supplements, the normal manual operation of such a device It is to be appreciated that simple variations of this device can be made while still keeping within the spirit and disclosure of the invention. For example, one embodiment of the device could use only a single sprocket gear and one set of teeth grooves on one half of the case to drive this device. While this single sprocket gear embodiment is an acceptable variation of the invention, the double gear embodiment is preferred.

Having fully described my device, I claim:

1. A powered fish tape device, comprising:
  (a) an outer case comprising two identical essentially cylindrical hollow halves fixedly connected to each other said case having a central circumferential slot on its edge;

(b) a handle slidably attached to said outer case at said circumferential slot such that the outer case may rotate while said handle remains stationary;
(c) a coiled linear fish tape having an inner end attached to the inner part of said case and having an outer end extending outside of said slot;
(d) a pair of sprocket gears having gear teeth, fixedly attached to a rotatable axis hub, wherein said axis hub and gears are attached to said handle;
(e) outer case grooves corresponding to said gear teeth located about the circumferential edge of each half of said case to engage said teeth;
wherein a drill may be attached to said axis hub and wherein rotating said drill and hub will retract said fish tape.

* * * * *